United States Patent [19]
Dale et al.

[11] Patent Number: 5,820,758
[45] Date of Patent: Oct. 13, 1998

[54] COMPOSITION AND METHOD FOR CLARIFYING AND DEODORIZING A STANDING BODY OF WATER

[75] Inventors: Parker Dale, Newport Beach; John E. Hill, Irvine, both of Calif.

[73] Assignee: Neozyme International, Inc., Newport Beach, Calif.

[21] Appl. No.: 790,376

[22] Filed: Jan. 28, 1997

Related U.S. Application Data

[60] Provisional application No. 60/010,890 Jan. 31, 1996.

[51] Int. Cl.$^6$ ................... C02F 3/00; C12P 1/02; C12N 9/00; C12N 1/16
[52] U.S. Cl. .................. 210/601; 210/606; 435/171; 435/183; 435/255.2; 435/262
[58] Field of Search ............ 435/183, 243–252.1, 435/255.2, 262, 262.5, 264, 171; 210/601, 605, 606

[56] References Cited

U.S. PATENT DOCUMENTS

| | | | |
|---|---|---|---|
| 2,424,049 | 7/1947 | Parker et al. | 134/3 |
| 3,404,068 | 10/1968 | Batistoni | 195/61 |
| 3,519,570 | 7/1970 | McCarty | 252/135 |
| 3,635,797 | 1/1972 | Battistoni et al. | 195/56 |
| 4,822,490 | 4/1989 | Dyadechko et al. | 210/611 |
| 5,071,765 | 12/1991 | Wiatr | 435/264 |
| 5,075,008 | 12/1991 | Chigusa et al. | 210/610 |
| 5,108,746 | 4/1992 | Rho et al. | 424/94.2 |
| 5,128,262 | 7/1992 | Lindoerfer et al. | 435/264 |
| 5,133,892 | 7/1992 | Chun et al. | 252/90 |
| 5,139,945 | 8/1992 | Liu | 435/232 |
| 5,227,067 | 7/1993 | Runyon | 210/606 |
| 5,326,477 | 7/1994 | Fugua et al. | 210/632 |
| 5,352,386 | 10/1994 | Rahman et al. | 252/548 |
| 5,352,387 | 10/1994 | Rahman et al. | 252/548 |
| 5,358,656 | 10/1994 | Humphreys et al. | 252/174.12 |
| 5,364,789 | 11/1994 | Guinn et al. | 435/262.5 |
| 5,369,031 | 11/1994 | Middleditch et al. | 435/284 |
| 5,372,944 | 12/1994 | Swanson | 435/252.1 |
| 5,385,685 | 1/1995 | Humphreys et al. | 252/174.17 |
| 5,389,279 | 2/1995 | Au et al. | 252/108 |
| 5,407,577 | 4/1995 | Nghiem | 210/606 |
| 5,466,396 | 11/1995 | Madison et al. | 252/557 |
| 5,503,766 | 4/1996 | Kulperger | 252/174.12 |
| 5,560,872 | 10/1996 | Rahman et al. | 510/392 |

*Primary Examiner*—David M. Naff
*Attorney, Agent, or Firm*—Merchant, Gould, Smith, Edell, Welter & Schmidt

[57] ABSTRACT

A composition and method are provided for clarifying and deodorizing a standing body of water such as fresh and salt water pools and water of spas, cooling towers, lakes and ponds such as aquaculture ponds. The composition contains by weight about 20.26% of a fermentation supernatant from a *Saccharomyces cerevisiae* culture, about 0.1% sodium benzoate, about 0.01% imidazolidinyl urea, about 0.15% diazolidinyl urea and about 9% non-ionic surfactant. Preferably, anionic and cationic surfactants and urea are absent from the composition. The composition may also contain about 0.05%, by weight, calcium chloride. The method is carried out by adding a solution of the composition to a body of water to provide in the water by weight about 0.02% to about 0.1% of a fermentation supernatant from a *Saccharomyces cerevisiae* culture, about 0.00005% to about 0.0001% sodium benzoate, about 0.000002% to about 0.00001% imidazolidinyl urea, about 0.00003% to about 0.00015% diazolidinyl urea, about 0.002% to about 0.009% non-ionic surfactant, and about 0.000005% calcium chloride when present.

11 Claims, No Drawings

COMPOSITION AND METHOD FOR CLARIFYING AND DEODORIZING A STANDING BODY OF WATER

RELATED APPLICATIONS

This application is based on Provisional Application Ser. No. 60/010,890 filed Jan. 31, 1996, which is incorporated herein by reference.

1. Field of the Invention

The present invention is directed at a biologically based composition for the treatment and clarification of the water of fresh and salt water pools, spas, cooling towers, aquaculture ponds, lakes and ponds.

2. Background of the Invention

The water of standing bodies of water such as fresh and salt water pools, spas, cooling towers, aquaculture ponds, lakes and ponds requires the constant addition of chemicals to clean the water and tiles of contaminants such as algae, suntan oil, body oils, scale and other contaminants introduced by the users of the pools and spas and by the environment. The treatment of all these contaminants requires a variety of chemical additives. For example, hypochlorite (HClO) is commonly used to disinfect pool and spa water, to inhibit the growth of microorganisms and to precipitate other contaminants so they can be removed by water filter systems. Other chemicals such as algaecides and clarifiers may need to be used in addition to the hypochlorite to maintain the desired water quality. In addition to chemical additives, the tiles of pools and spas must be mechanically cleaned or acid washed to remove scum and scale and filters must be cleaned to remove accumulated scum and particulates. The chemical and mechanical cleaning required to maintain pools, spas, cooling towers, aquaculture ponds, lakes and ponds is expensive and time consuming. Also, many of the chemicals used are toxic, and storage and use of the chemicals poses a risk to human health.

A number of processes and compositions which are less toxic than conventional chemicals have been developed which are directed at specific contaminants, for example: phenol oxidases and hydrogen peroxide have been used to decolorize pulp and paper mill waste-water (U.S. Pat. No. 5,407,577); enzymes from an atypical strain of *Bacillus stearothermophilus* have been used to degrade algal cell walls (U.S. Pat. No. 5,139,945); a combination of bacteria and enzymes have been used to improve the water quality of standing bodies of water (U.S. Pat. No. 5,227,067); cellulases have been used to digest wood/paper products (U.S. Pat. No. 5,326,477); *Xanthomonas maltophilia* and *Bacillus thuringiensis* have been used to degrade polar organic solvents (U.S. Pat. No. 5,369,031); yeast have been used to digest carbohydrate-containing waste-water (U.S. Pat. No. 5,075,008); a combination of β-glucanase, α-amylase and proteases have been used to digest microbial slime (U.S. Pat. No. 5,071,765); a combination of amylase, lipase and/or protease have been used to digest colloidal material such as starch, grease, fat and protein (U.S. Pat. No. 5,882,059); and a yeast fermentation product composition described in U.S. Pat. No. 3,635,797 has been described as effective in deodorizing sewage and ponds and in the degradation of organic waste. Some products, such as that described in U.S. Pat. No. 3,635,797 have been found to be unstable and yielded variable results from one batch to another. Other compositions described above are directed at a specific contaminant and none address the contaminants and odors which are usually found in or associated with water of fresh and salt water pools, spas, cooling towers, aquaculture ponds, lakes and ponds.

It is desirable to provide a composition for the treatment, clarification and deodorizing of water of fresh and salt water pools, spas, cooling towers, aquaculture ponds, lakes and ponds which is inexpensive and safe to use. Preferably such a composition would be suitable for use with existing water chemicals such as hypochlorite to enhance their cleaning properties and to reduce or eliminate the need for use of such chemical. Also it is desirable that such a composition eliminates the need for "additive" chemicals and for mechanical cleaning. It is also desirable that the composition eliminates the contaminants from the water to reduce the burden on the water filters.

SUMMARY OF THE INVENTION

The present invention is directed at a composition and method for the clarification of the water of fresh and salt water pools, spas, cooling towers, aquaculture ponds, lakes and ponds. The composition of the present invention comprises about 20.26%, by weight, of a fermentation supernatant from a *Saccharomyces cerevisiae* culture; about 0.1%, by weight, sodium benzoate; about 0.01%, by weight, imidazolidinyl urea; about 0.15%, by weight, diazolidinyl urea; and about 9%, by weight, of a non-ionic surfactant.

The method comprises adding to the water to be treated a solution comprising a yeast fermentation supernatant, preservatives, and a non-ionic surfactant.

DETAILED DESCRIPTION

The present invention is directed at a composition for the treatment and clarification of water of fresh and salt water pools, spas, cooling towers, aquaculture ponds, lakes and ponds.

Oxidative biological and chemical processes in aqueous environments are limited by the low solubility of oxygen in water. This physical limitation is defined by Henry's Law. It states that when the temperature is kept constant, the amount of a gas that dissolves into a liquid is proportional to the pressure exerted by the gas on the liquid.

The solubility of oxygen in pure water is only about 10 parts per million (ppm) at ambient temperatures and at one atmosphere pressure. The composition of the present invention has been observed to increase oxygen in water above levels which would be anticipated by Henry's Law.

For most aerobic bioprocesses, whether a wastewater treatment system or a biotechnology fermentation, dissolved oxygen is quickly consumed so that replenishing it becomes the factor which limits the rate of the process. Therefore, the most critical component of a bioprocess design is the means for the mass transfer of oxygen into the liquid phase of the process. For an actively respiring culture of bacteria at a cell density of about $10^9$ cells/ml, oxygen in the liquid medium must be replaced about 12 times per minute to keep up with the oxygen demand of the bacteria.

Water is typically aerated by increasing the contact surfaces between the gaseous and liquid phases. This can be done either by introducing a source of oxygen into a bulk liquid phase or by flowing dispersed water through a bulk gaseous (air) phases. Regardless of whether the gaseous or liquid phases dominate the oxygenation process, the mass transfer of oxygen, or other gas, is accomplished by introducing gas bubbles into the liquid phase. The efficiency of gas-liquid mass transfer depends to a large extent on the characteristics of the bubbles.

Bubble behavior strongly affects the following mass-transfer parameters: transfer of oxygen from the interior of the bubble to the gas-liquid interface; movement of oxygen across the gas-liquid interface; and diffusion of oxygen through the relatively stagnant liquid film surrounding the bubble.

It is of fundamental importance in the study of bubbles to understand the exchange of gases across the interface between the free state within the bubble and the dissolved state outside the bubble. It is generally agreed that the most important property of air bubbles in a bioprocess is their size. For a given volume of gas, more interfacial area (a) between the gas phase and liquid phase is provided if the gas is dispersed into many small bubbles rather than a few large ones. Small bubbles, 1–3 mm, have been shown to have the following beneficial properties not shared by larger bubbles:

Small gas bubbles rise more slowly than large bubbles, allowing more time for a gas to dissolve in the aqueous phase. This property is referred to as gas hold-up, concentrations of oxygen in water can be more than doubled beyond Henry's Law solubility limits. For example, after a saturation limit of 10 ppm oxygen is attained; at least another 10 ppm oxygen within small bubbles would be available to replenish the oxygen.

Once a bubble has been formed, the major barrier for oxygen transfer to the liquid phase is the liquid film surrounding the bubble. Biochemical engineering studies have concluded that transport through this film becomes the rate-limiting step in the complete process, and controls the overall mass-transfer rate. However, as bubbles become smaller, this liquid film decreases so that the transfer of gas into the bulk liquid phase is no longer impeded.

Surfactants in water can lead to the formation of very small bubbles, less than 1 mm in diameter. These small bubbles, referred to as microbubbles, are the result of the reduced surface tension at the interface between the gas/liquid interface caused by surfactants.

As large concentrations of gas are introduced into a solution such as by a chemical reaction or other mechanism, the liquid phase can become supersaturated if nucleation centers for the formation of bubbles are absent. At this point microbubbles can then form spontaneously, nucleating large bubble formation, and sweeping dissolved gases from the solution until supersaturation again occurred. In the presence of surfactants, it is likely that a larger portion of gas would remain in the solution as stable bubbles.

Microbubbles exposed to a dispersion of gas in a liquid show colloidal properties and are referred to as colloidal gas aphrons (CGA). CGA differ from ordinary gas bubbles in that they contain a distinctive shell layer consisting of a low concentration of a surfactant.

The composition of the present invention exhibits desirable properties associated with surfactant microbubbles. However, the microbubbles formed with the composition of the present invention appear to increase the mass transfer of oxygen in liquids. Without being bound by scientific theory, there are several possible explanations for this difference:

The earlier described surfactant microbubbles involved the use of pure synthetic surfactants that were either anionic or cationic. The surfactants formulated into the composition of the present invention are nonionic and are blended with biosurfactants which significantly alter the properties of bubble behavior.

The composition of the present invention requires a much lower concentration of surfactants for microbubble formation. It has been suggested that surfactant concentrations must approach the critical micelles concentration (CMS) of a surfactant system. In the composition of the present invention, microbubbles are formed below estimated CMCs for the surfactants used. This suggests that the composition of the present invention microbubbles are the result of aggregates of surfactant molecules with a loose molecular packing more favorable to gas mass transfer characteristics. A surface consisting of fewer molecules would be more gas permeable than a well-organized micelle containing gas.

In addition to surfactants, the composition of the present invention contains biologically derived catalysts. Both of these components tend to be amphiphilic, that is they have pronounced hydrophobic and hydrophilic properties. Amphiphilic molecules tend to cluster in water to form allow molecular weight aggregates which (as surfactant concentrations increase) result in micelle formation at concentrations ranging from $10^{-2}$ to $10^{14}$M. Aggregates of these amphiphilic molecules are the nuclei for microbubble formation.

The composition of the present invention appears to increase oxygen levels in fluids. Without being bound by scientific theory, it is believed this effect can be explained by either or both of two mechanisms:

Increased mass transfer of gases resulting from the interactions of non-ionic surfactants and other components of the composition of the present invention; and Delayed release of gases from microbubbles so that oxygen can be dispersed throughout a liquid rather than just at the point of introduction.

With either mechanism, it is likely that the tendency of composition of the present invention organizes into clusters, aggregates, or gas-filled bubbles provides a platform for reactions to occur by increasing localized concentrations of reactants, lowering the transition of energy required for a catalytic reaction to occur, or some other mechanism which has not yet been described. It has been established that the non-ionic surfactants used in the composition of the present invention are compatible with and enhance enzymatic reactions. The composition of the present invention has catalytic activities that is more like the catalytic activities of functionalized surfactants than conventional enzyme systems.

The composition of the present invention comprises a yeast fermentation supernatant, preservatives and a non-ionic surfactant, in the absence of an anionic or cationic surfactant.

Non-ionic surfactants suitable for use in the present invention include, but are not limited to, polyether non-ionic surfactants comprising fatty alcohols, alkyl phenols, fatty acids and fatty amines which have been ethoxylated; polyhydroxyl non-ionic (polyols) typically comprising sucrose esters, sorbital esters, alkyl glucosides and polyglycerol esters which may or may not be ethoxylated. In one embodiment of the present invention a surfactant of the general formulae:

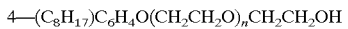

4—$(C_8H_{17})C_6H_4O(CH_2CH_2O)_nCH_2CH_2OH$ and in particular an ethoxylated octyl phenol which is sold under the tradename IGEPAL CA-630, is used. In another embodiment of the present invention a non-ionic surfactant such as the one sold under the tradename WITCONOL, and particularly WITCONOL SN-70 is used. In another embodiment of the present invention the surfactant is a polyglycol ether surfactant such as those sold under the tradename WITCONOL and in particular WITCONOL SN-70. The non-ionic surfactant acts synergistically to enhance the action of the yeast fermentation supernatant.

The composition of the present invention is similar to that described in U.S. Pat. No. 3,635,797 to Battistoni et al.

Briefly, yeast, *Saccharomyces cerevisiae*, is cultured in a medium comprising: a sugar source, such as sucrose from molasses, raw sugar, soy beans or mixtures thereof, a sugar concentration of about 10 to 30%, by weight, is used; malt such as diastatic malt at a concentration of about 7 to 12%, by weight; a salt, such as magnesium salts and in particular magnesium sulfate at a concentration of about 1 to 3%, by weight, and yeast is added to the medium to a final concentration of about 1 to 5%, by weight. The mixture is incubated at about 26° to 42° C. until the fermentation is completed, i.e. until effervescence of the mixture has ceased, usually about 2 to 5 days depending on the fermentation temperature. At the end of the fermentation the yeast fermentation product is centrifuged to remove the "sludge" formed during the fermentation. The supernatant (about 98.8%, by weight) is mixed with sodium benzoate (about 0.75%, by weight), diazolidinyl urea (about 0.15%, by weight), imidazolidinyl urea (about 0.05%, by weight), calcium chloride (about 0.25%, by weight) to form fermentation intermediate. The pH is adjusted to about 3.4 to about 3.6 with citric acid. The formulation for the fermentation intermediate is summarized in Table I.

TABLE I

Fermentation Intermediate

| Component | %, by weight |
| --- | --- |
| Fermentation supernatant | 98.59 |
| Na Benzoate | 1 |
| Imidazolidinyl urea | 0.01 |
| Diazolidinyl urea | 0.15 |
| Calcium chloride | 0.25 |
| Adjust pH | to about 3.7 to about 4.2 with phosphoric acid |

The fermentation intermediate is prepared by filling a jacketed mixing kettle with the desired quantity of the fermentation supernatant. With moderate agitation the pH is adjusted to 3.7 to 4.2 with phosphoric acid. With continuous agitation sodium benzoate, imidazolidinyl urea, diazolidinyl urea and calcium chloride are added. The temperature of the mixture is then slowly raised to about 40° C. and the mixture is agitated continuously. The temperature is maintained at about 40° C. for about one hour to ensure that all the components of the mixture are dissolved. The mixture is then cooled to about 20° to 25° C.

The fermentation intermediate is then formulated into the composition of the present invention (final composition) by mixing the fermentation intermediate (about 20.51%, by weight, of the final composition) with preservatives such as: sodium benzoate (about 0.1%, by weight, final composition); methyl paraben (about 0.1%, by weight, of the final composition); imidazolidinyl urea (about 0.01%, by weight, of the final composition); diazolidinyl urea (about 0.15%, by weight, of the final composition) and mixtures thereof, a non-ionic surfactant (about 9%, by weight, of the final composition) an acid such as citric acid, lactic acid and/or phosphoric acid to adjust the pH of the final combustion to about 3.5 to about 4.2. The final composition is then brought to 100% with water.

In a preferred embodiment of the present invention the final composition comprises about 20.51%, by weight, fermentation intermediate, about 0.1%, by weight, sodium benzoate, about 0.01%, by weight, imidazolidinyl urea, about 0.15%, by weight, diazolidinyl urea, about 9%, by weight, ethoxylated octyl phenol or alkyl alcohol ethoxylate and about 70.99%, by weight water. The pH of the solution is adjusted to about 3.4 to 3.6 with phosphoric acid (see Table II).

TABLE II

Final Composition

| Component | %, by weight |
| --- | --- |
| Sodium benzoate | 0.10 |
| Imidazolidinyl urea | 0.01 |
| Diazolidinyl urea | 0.15 |
| Non-ionic surfactant | 9.00 |
| Fermentation Intermediate | 20.51 |

The method for preparing the final composition is to charge a mixing kettle with the desired volume of water at 20° to 25° C. The surfactant is added to the water with moderate agitation. Preservatives are added while the solution is agitated. The mixture is agitated until the solids are dispersed. The fermentation intermediate is then added with gentle agitation. The pH is adjusted to about 3.4 to about 3.6 with phosphoric acid.

The final concentration of components in the final composition are summarized in Table III.

TABLE III

Final Composition

| Component | %, by weight |
| --- | --- |
| Na benzoate | 0.1 |
| Non-ionic surfactant | 9 |
| Imidazolidinyl urea | 0.01 |
| Diazolidinyl urea, | 0.15 |
| Calcium chloride | 0.05 |
| Fermentation supernatant | 20.26 (clarified) |
| Adjust pH | to about 3.4 to 3.6 with phosphoric acid |

The final composition is diluted for use. For use, the final composition is diluted about 1:10,000. However, under some conditions, such as for winterizing a pool or spa, the final composition may be used at a concentration of about 1:1,000 to about 1:5,000 and for cleaning tiles and exposed surfaces the final composition may be diluted as little as 1:10. Those skilled in the art are aware that dilutions of such compositions can be used and that over-dilution for a particular purpose can result in a decreased rate of digestion and therefore, effectiveness of the composition and that under-dilution for a particular purpose increases cost without increasing the rate of degradation or effectiveness. Ideally, the final composition is diluted to optimize the rate of degradation or effectiveness and to minimize costs.

The composition of the present invention is added weekly to maintain the clarity and quality of the water of fresh and salt water pools, spas, cooling towers, aquaculture ponds, lakes and ponds.

In use, the composition of the present invention reduces or eliminates the need to use sanitizers, scale removers, algaecides, clarifiers, filter cleaners and acid washing. The composition of the present invention also results in the enzymatic degradation of oils such as suntan lotions and body oils and eliminates these contaminants from the pool and spa water. The degradation of such oils also reduces or eliminates the chemical and mechanical cleaning of tiles and filters since the oils are removed from the water prior to their contamination of and accumulation on the tiles and filters. The composition also degrades urea, a major component of urine which is a common contaminant of pools and spas.

Algae and bacteria are also reduced or eliminated from pool and spa water by use of the composition of the present invention.

EXAMPLE 1

Comparison of the Fermentation Intermediate of U.S. Pat. No. 3,635,797 and the Final Compound of the Present Invention The present invention is a modification of the fermentation composition described in U.S. Pat. No. 3,635,797. The fermentation intermediate of U.S. Pat. No. 3,635,797 and the composition of the present invention are set forth for comparison in Table IV.

TABLE IV

| Component | U.S. Pat. No. 3,635,797 (%, by weight) | Final Composition (%, by weight) |
|---|---|---|
| Na benzoate | 0 | 0.1 |
| Imidazolidinyl urea | 0 | 0.01 |
| Diazolidinyl urea | 0 | 0.15 |
| Anionic surfactants | 20 | 0 |
| Nonionic surfactants | 18 | 9 |
| Cationic surfactants | 25 | 0 |
| Lactic acid | 9 | 0 |
| Citric acid | 1.7 | 0 |
| Urea | 40 | 0 |
| Pine oil | 3.5 | 0 |
| Calcium chloride | 0 | 0.05 |
| Fermentation Super. | 22 | 20.26 (clarified) |
| Adjust pH | about 3.0 (citric acid) | about 3.5 to 4 ($H_3PO_4$) |

The elimination of anionic surfactants, cationic surfactants and urea increased the performance of the final formulation in its ability to clarify pool and spa water. The addition of imidazolidinyl urea, diazolidinyl urea and sodium benzoate increased the stability of the final formulation by inhibiting degradation of the fermentation supernatant. Centrifugation to form the fermentation supernatant resulted in a decrease in particulate matter which increased the clarity of the water being treated and reduced the "load" on filters used to remove particulate matter from the water being treated. Centrifugation of the composition of the present invention also aids in stabilizing the composition.

EXAMPLE 2

Treatment of Swimming Pools

Swimming pools and spas at Arizona State University are used all year round. The pools and spas typically have a large amount of oils, from suntan oils, contaminating the water and causing excessive scum on tiles. The product of the present invention (0.1%, by weight, sodium benzoate; 9%, by weight, IGEPAL CA-630; 0.01%, by weight, imidazolidinyl urea; 0.15%, by weight, diazolidinyl urea, 0.05%, by weight, calcium chloride; 20.26%, by weight, fermentation supernatant) was introduced into the most heavily used pool.

The treatment of the water eliminated scum build up on tiles and eliminated the need for the addition of algaecides and clarifiers to the pool water.

EXAMPLE 3

Treatment of Cat Fish Ponds

Nine levee ponds with an area of 400 m$^2$ and an average depth of 0.9 to 1 m and maximum depth of 1.3 to 1.5 m were used in the study. The ponds were rectangular (2 length: 1 width) with earthen bottoms that gradually sloped from depths of 20 to 40 cm at the vertical edge supported by wooden or concrete walls to 130 to 150 cm at drains. The ponds were used annually for experiments on water quality and pond fertilization.

Soils used for construction of the ponds included typic, kandiudults (clayey, kaolinitic and termic). These soils are acidic, reddish brown soils with low cation exchange capacity and base saturation less than 35%. In their native states these soils have low concentrations of phosphorus and organic matter. The normal annual temperature at the location of the ponds is 17.2° C. (normal minimum=11.1° C.; normal maximum=23.2° C.) and normal annual rainfall is 1,434 mm. The ponds are supplied by water from a reservoir filled with runoff from woodlands. The water is alkaline and has a total hardness value below 20 mg/l as $CaCO_3$ and soluble reactive phosphorus concentrations less than 0.005 mg/l.

In spring the ponds were stocked with about 6,000 channel catfish fingerlings per acre. The average fish weight at stocking was 10.7 kg per thousand fingerlings. A 32% crude protein, pelleted feed was offered 7 days per week at 3% of body weight per day. When dead fish were observed in ponds they were removed, weighed and the feeding rates were adjusted. Daily feedings did not exceed 75 kg/ha. All ponds had a 0.25 kW vertical pump aerator (Air-O-Lator Corp., Kansas City, Mo.). Aerators were operated from dusk to dawn from the end of June until harvest in October. Water levels were maintained 10 to 12 cm below the tops of standing drain pipes to prevent overflow after rain. Water was added from a pipeline when necessary to replace evaporation and seepage losses.

The product of the present invention was applied as follows:

Three ponds were randomly selected to serve as control ponds (control);

Three ponds were randomly selected and treated with a final concentration of the composition of the present invention of 2.0 parts per million (ppm) once a month (low dose); and The three remaining ponds were treated with a final concentration of the composition of the present invention of 2.0 parts per million (ppm) once a week (high dose).

The ponds were sampled for dissolved oxygen, temperature, pH, specific conductance, chemical oxygen demand, biochemical oxygen demand, soluble reactive phosphorous, total ammonia nitrogen, nitrate, chlorophyll a and bacteria abundance. Samples were taken from three locations in each lake every two weeks.

At harvest the following data were collected: number and total weight of fish, percentage survival, average weight of individual fish with estimates in variations in weight and food conservation ratio.

The use of the composition of the present invention had measurable influences on water quality on some of the sample dates. For, example, the chemical and biological oxygen demands and early morning dissolved oxygen concentrations tended to be lower during the final 8 to 10 weeks of the grow-out period in the ponds treated with the composition of the present invention than the controls. There was also evidence of enhanced mineralization of organic matter from greater concentrations of soluble reactive phosphorous and total ammonia nitrogen in treated ponds as compared to control ponds. The lower chemical and biological demand on some dates in the treated ponds also suggests increased rates of organic matter degradation. It is expected that the composition of the present invention would be beneficial to channel catfish ponds stocked at normal rates. It would be expected to overcome the water quality problems which often occur. It is also expected that the composition of the present invention would be beneficial in ponds stocked and fed at high rates such as is often the case with intensive shrimp ponds.

The present invention is not to be limited to the specific embodiments shown which are merely illustrative. Various and numerous other embodiments may be devised by one skilled in the art without departing from the spirit and scope of this invention.

What is claimed is:

1. A composition for the clarification and deodorizing of a standing body of water comprising a solution of about 20.26%, by weight, of a fermentation supernatant from a *Saccharomyces cerevisae* culture; about 0.1%, by weight sodium benzoate, about 0.01%, by weight, imidazolidinyl urea; about 0.15%, by weight diazolidinyl urea; and about 9%, by weight, of a non-ionic surfactant, wherein urea and anionic and cationic surfactants are absent from said composition.

2. A composition as recited in claim 1 wherein the composition is diluted about 1 volume into 10,000 volumes of water.

3. A composition as recited in claim 1 wherein the composition is diluted about 1 volume into 1,000 to 5,000 volumes of water for winterizing the water.

4. A composition as recited in claim 1 wherein the composition is diluted about 1:10 for use in washing pool or spa tiles.

5. The composition of claim 1 wherein the non-ionic surfactant is a surfactant of the general formulae:
4—$(C_8H_{17})C_6H_4O(CH_2CH_2O)_n Ch_2CH_2OH$.

6. A method of clarifying and deodorizing a standing body of water comprising adding to the water the composition claimed in claim 1 to provide in the water about 0.02% to about 00.1%, by weight, of a fermentation supernatant from a *Saccharomyces cerevisiae* culture; about 0.00005% to about 0.0001%, by weight, sodium benzoate; about 0.000002% to about 0.00001%, by weight, imidazolidinyl urea; about 0.00003% to about 0.00015%, by weight, diazolidinyl urea; and about 0.002% to about 0.009%, by weight, of a non-ionic surfactant.

7. A method as recited in claim 6 wherein the composition is added in the absence of any additional water treatments.

8. A method of clarifying a standing body of water consisting essentially of providing in the water a concentration of about 0.002%, by weight, of a fermentation supernatant from a *Saccharomyces cerevisae* culture; about 0.00001%, by weight, sodium benzoate, about 0.000001%, by weight, imidazolidinyl urea; about 0.000015%, by weight, diazolidinyl urea; about 0.000005%, by weight calcium chloride; and about 0.0009%, by weight, of a non-ionic surfactant.

9. A composition for the clarification and deodorizing of a standing body of water consisting essentially of a solution of about 20.26%, by weight, of a fermentation supernatant from a *Saccharomyces cerevisae* culture; about 0.1%, by weight sodium benzoate, about 0.01%, by weight, imidazolidinyl urea; about 0.15%, by weight diazolidinyl urea; about 0.05%, by weight calcium chloride; and about 9%, by weight, of a non-ionic surfactant.

10. The composition of claim 9 wherein the non-ionic surfactant is a surfactant of the general formulae:
4—$(C_8H_{17})C_6H_4O(CH_2CH_2O)_n Ch_2CH_2OH$.

11. A method of clarifying and deodorizing a standing body of water comprising adding to the water the composition claimed in claim 10 to provide in the water about 0.02% to about 0.1%, by weight, of a fermentation supernatant from a *Saccharomyces cerevisiae* culture; about 0.00005% to about 0.0001%, by weight, sodium benzoate; about 0.000002% to about 0.00001%, by weight, imidazolidinyl urea; about 0.00003% to about 0.00015%, by weight, diazolidinyl urea; and about 0.002% to about 0.009%, by weight, of a non-ionic surfactant.

* * * * *